United States Patent
Balakrishnan et al.

(10) Patent No.: US 9,655,008 B2
(45) Date of Patent: May 16, 2017

(54) SYSTEMS AND METHODS FOR IMPROVED NETWORK SCANNING FOR QUALITY OF SERVICE APPLICATIONS

(71) Applicant: APPLE INC., Cupertino, CA (US)

(72) Inventors: Swaminathan Balakrishnan, Sunnyvale, CA (US); Sarma V. Vangala, San Jose, CA (US)

(73) Assignee: APPLE INC., Cupertino, CA (US)

( * ) Notice: Subject to any disclaimer, the term of this patent is extended or adjusted under 35 U.S.C. 154(b) by 78 days.

(21) Appl. No.: 14/503,087

(22) Filed: Sep. 30, 2014

(65) Prior Publication Data

US 2016/0095020 A1 Mar. 31, 2016

(51) Int. Cl.
| | |
|---|---|
| *H04W 4/00* | (2009.01) |
| *H04W 36/00* | (2009.01) |
| *H04W 8/22* | (2009.01) |
| *H04W 48/18* | (2009.01) |
| *H04W 60/00* | (2009.01) |

(52) U.S. Cl.
CPC .......... *H04W 36/0022* (2013.01); *H04W 8/22* (2013.01); *H04W 36/0083* (2013.01); *H04W 48/18* (2013.01); *H04W 60/00* (2013.01)

(58) Field of Classification Search
None
See application file for complete search history.

(56) References Cited

U.S. PATENT DOCUMENTS

| | | | | |
|---|---|---|---|---|
| 8,400,931 | B2* | 3/2013 | Wong ................. | H04W 76/022 370/244 |
| 9,104,611 | B1* | 8/2015 | Bertz ................... | H04L 61/308 |
| 9,210,687 | B1* | 12/2015 | Reeves ............. | H04W 36/0022 |
| 2009/0116447 | A1* | 5/2009 | Balasubramanian . | H04W 36/14 370/331 |
| 2013/0336374 | A1* | 12/2013 | Ruvalcaba ........... | H04W 48/18 375/222 |
| 2014/0080468 | A1* | 3/2014 | Zhang .................. | H04W 24/02 455/418 |
| 2015/0229491 | A1* | 8/2015 | Solovyev ............ | H04L 65/1016 370/328 |

(Continued)

Primary Examiner — Phirin Sam
(74) Attorney, Agent, or Firm — Fay Kaplun & Marcin, LLP (57) ABSTRACT

A user equipment ("UE") that performs methods to connect to multiple radio access networks (RAN) including a home network RANs and roaming RANs to perform communications. An exemplary method performed by a UE initially connected to a Long Term Evolution radio access network (LTE-RAN) of a home network and registered with a voice over LTE (VoLTE) service of the home network to perform voice communications via the LTE-RAN, includes detecting a service disrupting event preventing VoLTE communication with the LTE-RAN, deregistering from the VoLTE service of the home network, scanning for available bands in the LTE-RAN of the home network and while scanning for the available bands in the LTE-RAN of the home network, connecting to a further radio access network (RAN) of the home network that allows circuit-switched communications with the home network, wherein the UE performs voice communications as circuit-switched communications via the further RAN.

20 Claims, 4 Drawing Sheets (56) References Cited

U.S. PATENT DOCUMENTS

| | | | |
|---|---|---|---|
| 2015/0336374 A1* | 11/2015 | McNeil | B41F 9/028 101/212 |
| 2015/0382265 A1* | 12/2015 | Da Silva | H04W 24/02 455/423 |
| 2016/0021146 A1* | 1/2016 | Mufti | H04L 65/1016 370/328 |

* cited by examiner

SYSTEMS AND METHODS FOR IMPROVED NETWORK SCANNING FOR QUALITY OF SERVICE APPLICATIONS

BACKGROUND

Long-Term Evolution ("LTE") is a standard for wireless communication of high-speed data for mobile phones and data terminals. The LTE standard has been developed by the 3rd Generation Partnership Project ("3GPP") and is described as a natural upgrade path for carriers using prior generation networks, such as Global System for Mobile Communications/Universal Mobile Telecommunications System ("GSM/UMTS") networks and Code Division Multiple Access ("CDMA2000") networks. Through the use of new digital signal processing ("DSP") techniques and modulations, LTE has increased the capacity and speed of wireless data networks.

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Since voice calls in GSM, UMTS and CDMA2000 utilize circuit switched data transmissions, carriers adopting the LTE standard need to re-engineer their voice call network. Various approaches include Voice over LTE ("VoLTE"), Circuit-switched fallback ("CSFB"), and Simultaneous voice and LTE ("SVLTE"). For instance, the VoLTE approach uses an IP Multimedia Subsystem ("IMS") network having specific profiles for control and media planes of voice service on LTE. Accordingly, VoLTE communications result in the voice service being delivered as data flows within the LTE data bearer. Thus, there is no requirement for the legacy circuit-switched voice network to be maintained. Furthermore, VoLTE communications has up to three times more voice and data capacity than UMTS networks and up to six times more than GSM networks. Using the CSFB approach, LTE provides data services while a received or initiated voice call falls back to the circuit-switched network. Under the SVLTE approach, the user equipment ("UE") works simultaneously in both the LTE and circuit switched modes, wherein the LTE mode provides data services and the circuit switched mode provides the voice service.

SUMMARY

In one exemplary embodiment, a user equipment ("UE") connected to a Long Term Evolution radio access network (LTE-RAN) of a home network and registered with a voice over LTE (VoLTE) service of the home network to perform voice communications via the LTE-RAN performs a method. The method includes detecting a service disrupting event preventing VoLTE communication with the LTE-RAN, deregistering from the VoLTE service of the home network, scanning for available bands in the LTE-RAN of the home network and while scanning for the available bands in the LTE-RAN of the home network, connecting to a further radio access network (RAN) of the home network that allows circuit-switched communications with the home network, wherein the UE performs voice communications as circuit-switched communications via the further RAN.

In a further exemplary embodiment, user equipment ("UE") having a transceiver and a processor is described. The transceiver is configured to connect to radio access networks. The processor is coupled to a memory and executes a program stored in the memory, wherein the execution of the program causes the processor to perform operations. The operations include detecting a service disrupting event preventing packet-switched communication with a home network, deregistering from an IP Multimedia Subsystem (IMS) of the home network, scanning for available bands in the home network and while scanning for available bands in the home network, switching from a packet-switched communication operation to a circuit-switched communication operation.

In a further exemplary embodiment, a non-transitory computer readable storage medium including a set of instructions is described. The instructions, when executed, cause a processor to perform operations including detecting a service disrupting event for a voice over Long Term Evolution (VoLTE) communication with an LTE radio access network (LTE-RAN) of a home network, deregistering from a VoLTE service of the home network, scanning for available bands in the LTE-RAN of the home network and while scanning for the available bands in the LTE-RAN of the home network, connecting to a further radio access network (RAN) of the home network that allows circuit-switched communications with the home network, wherein voice communications are performed as circuit-switched communications via the further RAN.

DETAILED DESCRIPTION

The exemplary embodiments may be further understood with reference to the following description and the appended drawings, wherein like elements are referred to with the same reference numerals. The exemplary embodiments show systems and methods for improved network scanning for quality of service ("QoS") based applications. For instance, exemplary embodiments described herein may allow for faster public land mobile network ("PLMN") scans by a mobile device such as a user equipment ("UE"). As will be described in greater detail below, the exemplary embodiments allow for the UE to check the LTE bands in the PLMN, as opposed to checking all of the available LTE bands in the Equivalent Home PLMN ("EHPLMN").

Figure 1:
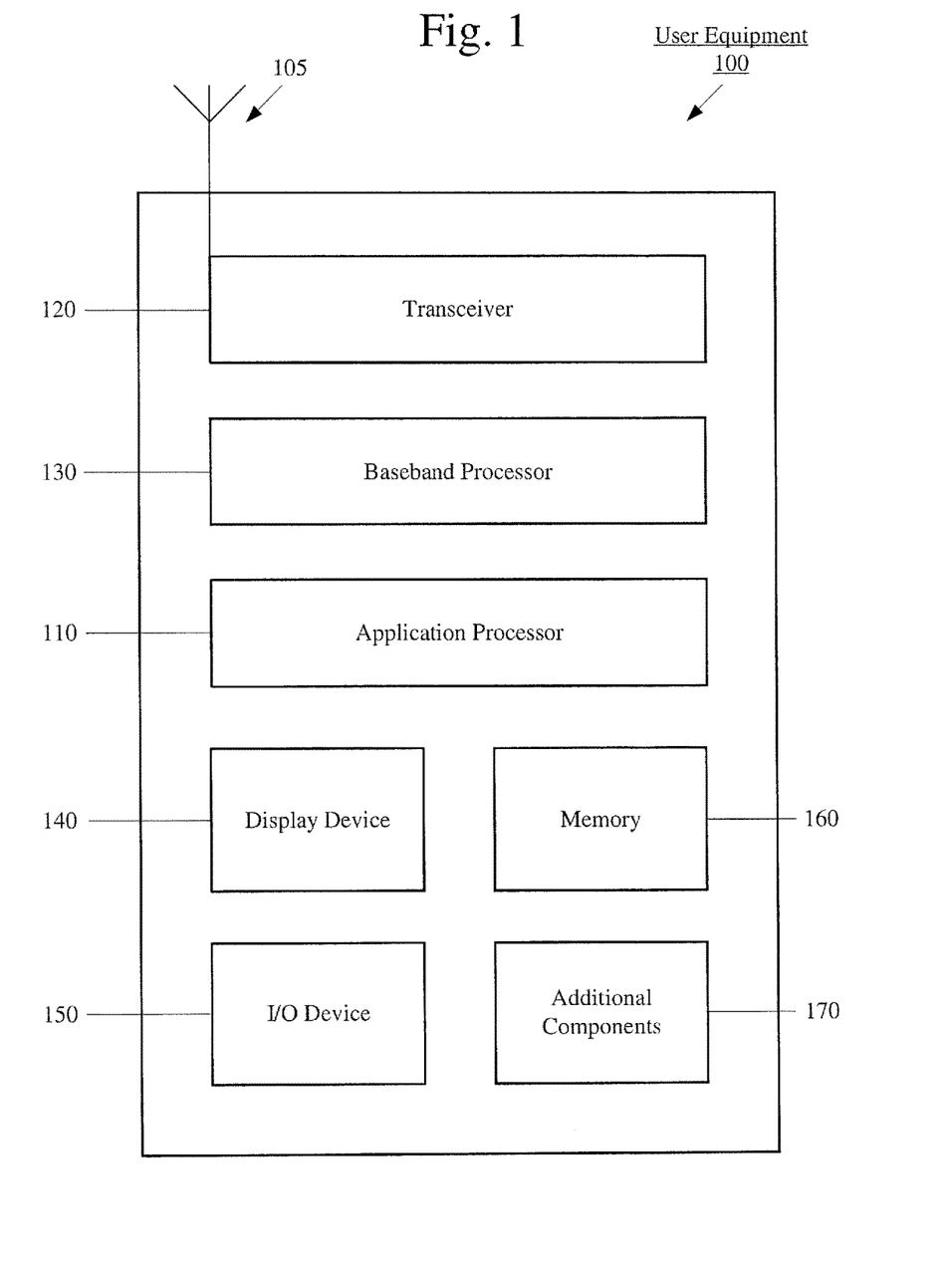
FIG. 1 shows an exemplary UE for improved network scanning for QoS-based applications through faster PLMN scans according to an exemplary embodiment.

FIG. 1 shows an exemplary UE 100 for improved network scanning for QoS-based applications through faster PLMN scans according to an exemplary embodiment. The UE 100 may represent any electronic device that is configured to perform wireless functionalities. For example, the UE 100 may be a portable device such as a phone, a smartphone, a tablet, a phablet, a laptop, etc. In another example, the UE 100 may be a stationary device such as a desktop terminal. The UE 100 may be a VoLTE-capable SRLTE device for communicating with a mobile switching center. The UE 100 may include an antenna 105 connected to a transceiver 120, which is connected to a baseband processor 130, which is further connected to an applications processor 110. The UE 100 may further include a display 140, an I/O device 150, a memory arrangement 160 that are accessible by the baseband processor 130 or the applications processor 110. Those skilled in the art will understand that the UE 100 may also include additional components 170, for example, a Bluetooth/WiFi transceiver, further input devices (e.g., a keypad, a touchscreen, etc.), a battery, etc.

The transceiver 120 and the baseband processor 130 may be used to perform operations such as, but not limited to, scanning the network for specific radio frequency bands, exchanging information with one or more mobile switching centers, etc. It should be noted that the exemplary embodiments are described as being performed by the transceiver 120 and the baseband processor 130. However, either of these components may perform the described functionalities without the other component. In addition, other components (e.g., the application processor 110) may also perform some or all of the functionalities described herein. The application processor 110, the transceiver 120 and the baseband processor 130 may be, for example, general purpose processors, an application specific integrated circuit (ASIC), another type of integrated circuit and these processors may execute software programs or firmware.

The transceiver 120 and the baseband processor 130 may be used to perform operations such as, but are not limited to, scanning the network for specific radio frequency bands, such as LTE bands in the HPLMN of the UE 110, exchanging information with one or more mobile switching centers, etc.

Figure 2:
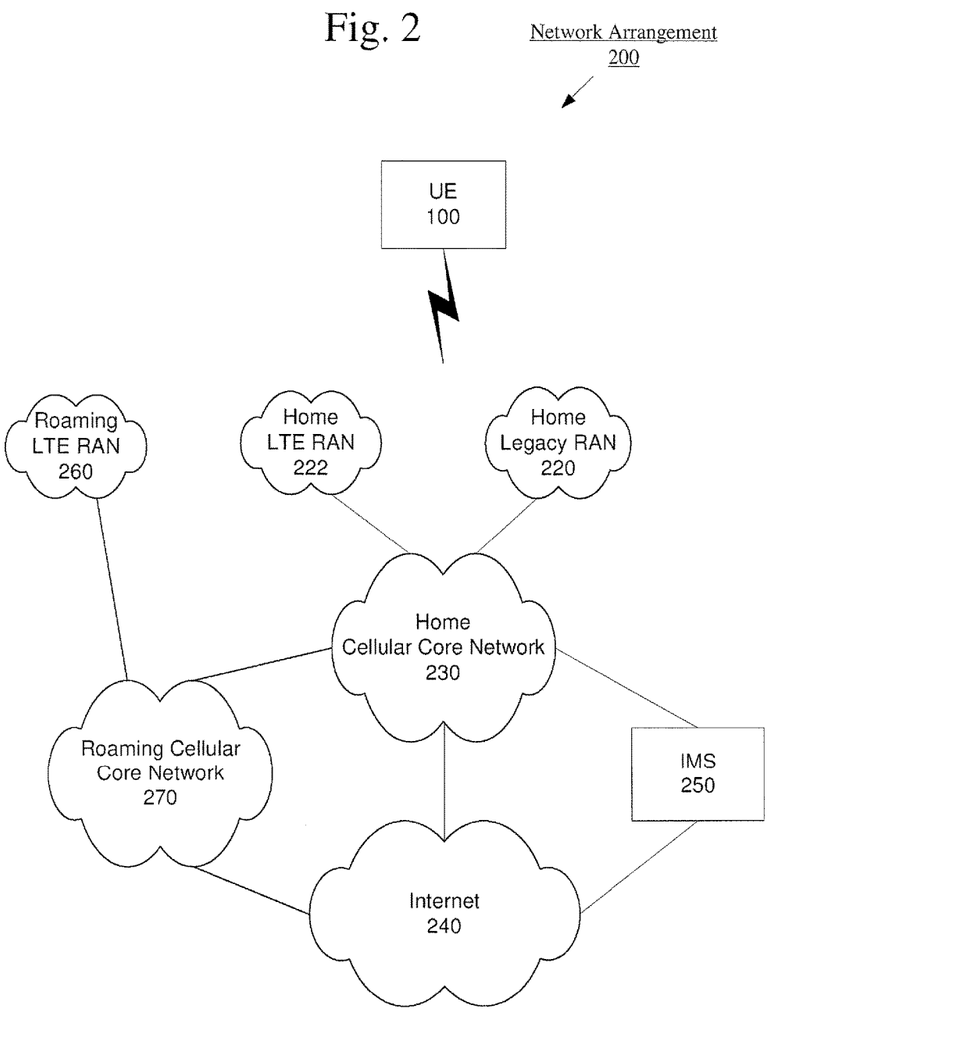
FIG. 2 shows an exemplary network arrangement 200.

FIG. 2 shows an exemplary network arrangement 200. The exemplary network arrangement 200 includes the UE 100 and may include additional UEs (not shown). As described above, the UE 100 may be configured to communicate directly with one or more networks. In this example, the networks with which the UE 100 may communicate are a Home legacy radio access network (RAN) 220, a Home Long Term Evolution radio access network (LTE-RAN) network 222 and a roaming LTE-RAN 260. However, it should be understood that the UE 100 may also communicate with other types of wired or wireless networks. In this example, it may be considered that the legacy RAN 220 is a CS-based network that may provide, for example, CDMA voice communications for the UE 100 and the Home LTE-RAN 222 and Roaming LTE-RAN 260 may provide a VoLTE capability to the UE 100. It should also be noted that there may be several Roaming LTE-RANs that may be available to the UE 100 depending on the roaming agreements that are in place for the Home provider of the UE 100. Thus, the term "Home" is meant to convey that the UE 100 is a subscriber of the network, while the term "Roaming" is meant to convey that the UE 100 may access such networks based on agreements between the provider of the Home network and the roaming networks.

The legacy RAN 220 and the LTE-RANS 222 and 260 may be portions of cellular networks that may be deployed by cellular providers (e.g., Verizon, AT&T, Sprint, T-Mobile, etc.). These networks 220, 222, 260 may include, for example, base stations (Node Bs, eNodeBs, HeNBs, etc.) that are configured to send and receive traffic from client stations that are equipped with the appropriate cellular chip set. Examples of the legacy RAN may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks.

In addition to the networks 220, 222, and 260, the network arrangement 200 also includes a Home cellular core network 230, a Roaming cellular core network 270 and the Internet 240. The Home cellular core network 230, the Home legacy RAN 220 and the Home LTE-RAN 222 may be considered a cellular network that is associated with a particular cellular provider (e.g., Verizon, AT&T, Sprint, T-Mobile, etc.). The Roaming LTE-RAN 260 and the Roaming cellular core network 270 may be considered to be another cellular network that is associated with a different provider. The cellular core networks 230, 270 may be considered to be the interconnected set of components that manages the operation and traffic of the cellular network. The interconnected components of the cellular core networks 230, 270 may include any number of components such as servers, switches, routers, etc. The cellular core networks 230, 270 also manage the traffic that flows between the cellular networks 230, 270 and the Internet 240.

The network arrangement 200 also includes an IP Multimedia Subsystem (IMS) 250. The IMS 250 may be generally described as an architecture for delivering multimedia services to the UE 100 using the IP protocol. The IMS 250 may include a variety of components to accomplish this task. For example, a typical IMS 250 includes a Home Subscriber (HS) server that stores subscription information for a user of the UE 100. This subscription information is used to provide the correct multimedia services to the user. The IMS 250 may communicate with the cellular core networks 230, 270 and the Internet 240 to provide the multimedia services to the UE 100. The IMS 250 is shown in close proximity to the cellular core network 230 because the cellular provider typically implements the functionality of the IMS 250. However, it is not necessary for this to be the case. The IMS 250 may be provided by another party. The Roaming cellular core network 270 may be associated with a different IMS, e.g., the cellular provider associated with the cellular core network 270 may implement its own IMS.

Thus, the network arrangement 200 allows the UE 100 to perform functionalities generally associated with computer and cellular networks. For example, the UE 100 may perform voice calls to other parties, may browse the Internet 140 for information, may stream multimedia data to the UE 100, etc. As noted above, VoLTE communications have provided a way for transmitting simultaneous voice and data traffic over LTE technology. However, at times when the UE travels beyond the LTE coverage, the UE is typically redirected to the underlying 3G network for sending and receiving data traffic. In the example of network arrangement 200, when the UE 100 is beyond the coverage of the Home LTE-RAN 222, the UE may be redirected to the Home Legacy RAN 220 for voice communications.

However, this fall back to the Home Legacy RAN 220 for voice communications does not occur immediately upon detection of a marginal LTE scenario such as a radio link failure ("RLF") due to uplink limited scenarios or an out of service ("OOS") such as due to a reference signal received power ("RSRP") value being less than a threshold value of a serving cell (e.g., SRxlev). In these scenarios, the UE 100 may go into a radio resource control ("RRC") inactive state while continuing to remain in the IMS-registered domain for a predetermined period, (e.g., until an IMS registration time expires). The UE 100 will then scan for LTE bands associated with Home PLMN ("HPLMN") (e.g., the LTE bands associated with Home LTE-RAN 222) and LTE bands associated with the EHPLMN (e.g., the LTE bands associated with Roaming LTE-RAN 222). This LTE band scan may lead to the UE 100 acquiring an LTE band on the Home LTE-RAN 222 or the Roaming LTE-RAN 260, or could result in a delay for the UE acquiring the fall back Home Legacy RAN (e.g., CDMA).

Figure 3:
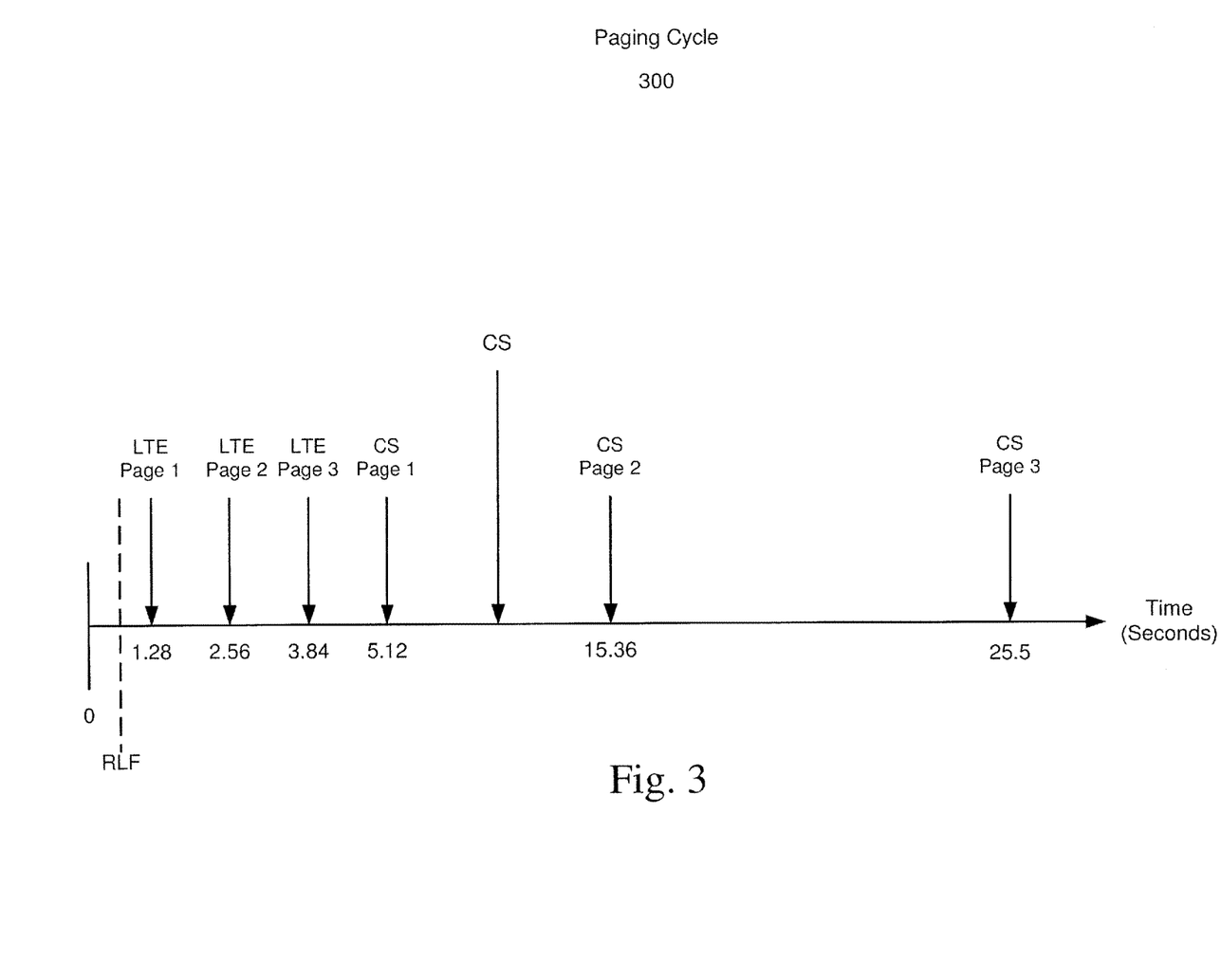
FIG. 3 shows an exemplary paging cycle for the UE.

There are multiple issues associated with this operation. For example, such a scan of all available LTE bands may take a relatively long period of time. During this time, the UE 100 may miss pages. For example, FIG. 3 shows an exemplary paging cycle 300 for the UE 100. In this example, it is considered that the UE 100 is IMS 250 registered and in VoLTE operation. An exemplary LTE paging cycle is 1.28 seconds for three attempts. Thus, if the start of the cycle is considered time 0, the Home LTE-RAN 222 will attempt three pages at 1.28 seconds, 2.56 seconds and 3.84 seconds. If the UE 100 does not respond, the Home cellular core network 230 will then attempt to page the UE 100 using the legacy RAN 220. An exemplary paging cycle for a legacy RAN 220 operating in CDMA is a first page at 5.12 seconds, a second page at 15.36 seconds and a third page at 25.5 seconds. Thus, in this scenario, if the UE 100 experiences, for example, an RLF at some time before the 1.28 second mark, the UE 100 will enter the inactive state, but continue to remain IMS 250 registered. The UE 100 will then scan for the available LTE bands, e.g., the LTE bands of Home LTE-RAN 222 and Roaming LTE-RAN 220. In real world applications, scanning all these LTE bands could take up to 60 seconds. As can be seen from the timeline in FIG. 3, if the UE 100 falls back to the legacy RAN 220 after 60 seconds, the UE 100 will completely miss the CS pages from the legacy RAN 220. In addition to the amount of time it takes to scan all the LTE bands, the scanning is a drain on the battery of the UE 100. For example, a band scan may cause a battery drain of around 600 mW for the period of the LTE scan that ranges for a few seconds.

Another issue is that even if the UE 100 is successful in acquiring a Roaming LTE band, the user may be responsible for roaming charges. In addition, when the UE 100 acquires a roaming LTE band, the UE 100 will continue to scan the LTE bands of the Home LTE-RAN 222 so that the UE 100 may switch back to the Home PLMN as soon as possible. Thus, these extra scans also use battery power of the UE 100.

As will be described in greater detail below, the exemplary embodiments of the systems and methods described herein will address these issues. For a UE in an idle state during the RF scenarios discussed above, the exemplary embodiments may check the LTE bands present in the PLMN (e.g., the Home LTE-RAN 222) rather than all of the available LTE bands in the EHPLMN (e.g., the Home LTE-RAN 222 and the Roaming LTE-RAN 260). Accordingly, these embodiments may also help to move the UE into the underlying 3G technology faster and avoid any missed pages.

Figure 4:
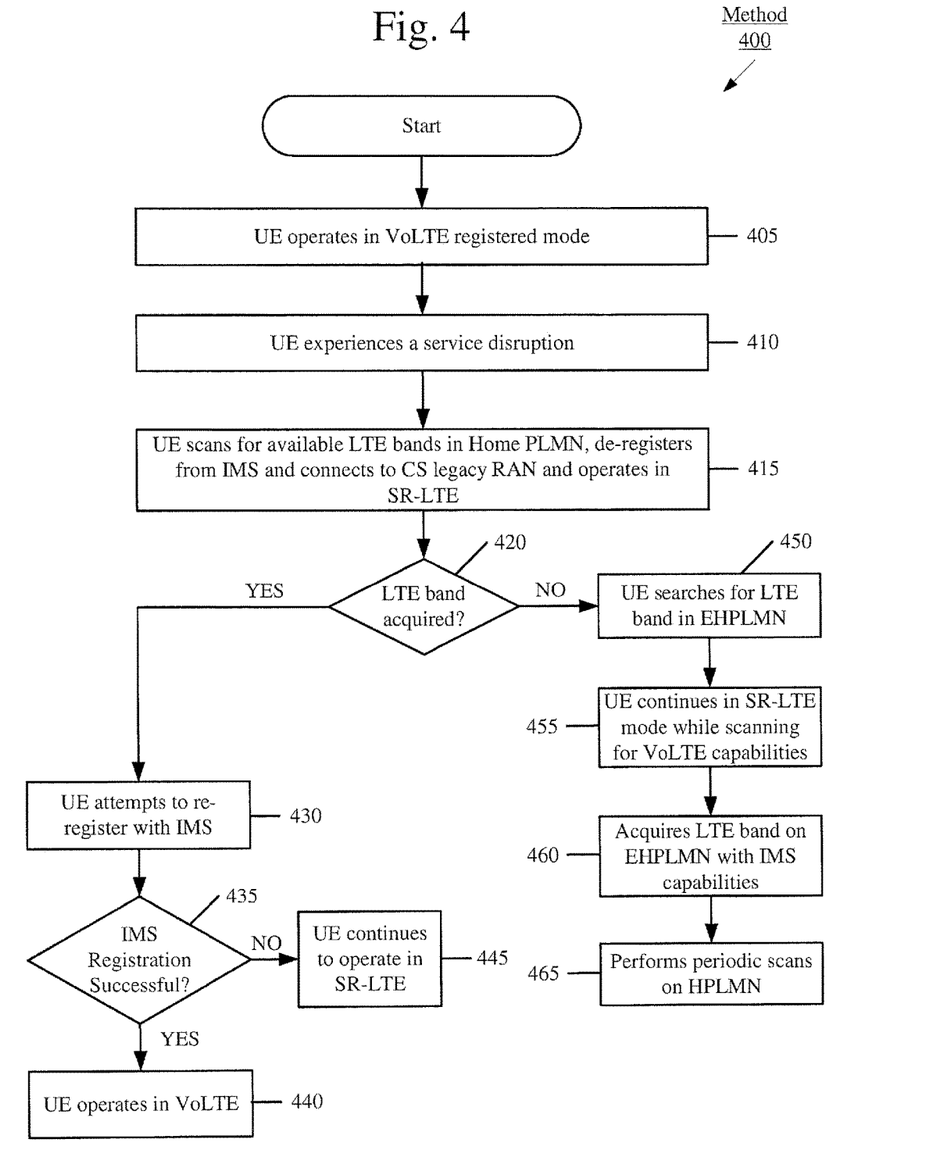
FIG. 4 shows an exemplary method for improved network scanning for QoS-based applications through faster PLMN scans by a UE 110.

FIG. 4 shows an exemplary method 400 for improved network scanning for QoS-based applications through faster PLMN scans by a UE 100. Accordingly, the operations performed by the UE implementing the method 400 will be described with reference to the UE 100 and its components described above with reference to FIG. 1 and the exemplary network arrangement 200 of FIG. 2.

In step 405, the UE 100 may operate in a first communication mode, such as the above-described VoLTE transmission mode, for both voice and data communications, e.g., the UE is connected to the Home LTE-RAN 222. While the UE 100 is operating in VoLTE, the UE 100 may be registered with one of many serving call session control functions ("CSCFs") of the HPLMN. Thus, the home cellular core network 230 may be aware that the UE 100 is active. In addition, during the registration, the UE 100 may communicate its current IP address to the network, such as a temporary dynamic IP address. Furthermore, the UE 100 may be informed of the IP address of the allocated serving CSCF to allow the UE 100 to initiate communication with the IMS 250.

In step 410, the UE 100 may experience a service-disrupting event, such as a radio link failure ("RLF") state or an out of service ("OOS") state. One skilled the art would understand that any number of service-disrupting events may result in the UE 110 losing communication with the network.

In step 415, the UE 100 scans for available LTE bands within the HPLMN, e.g., the Home LTE-RAN 222 bands. In addition, the UE deregisters from the IMS 250. The deregistration from the IMS 250 allows the UE 100 to connect to the Home Legacy RAN 220. For example, the UE 110 may transition to single radio ("SR") LTE mode (e.g., 1x-SRLTE voice mode). Thus, while the scanning for the LTE bands is occurring, the UE 100 may still receive pages over the CS network (e.g., Home legacy RAN 220). Referring back to FIG. 3, if the UE 100 deregisters from the IMS 250 immediately (or very shortly after) the detection of the RLF, the UE 100 is assured of receiving at least one of the CS pages, even if the UE 100 continues to scan the LTE bands because the UE 100 has established a CS connection via the Home legacy RAN 220.

In step 420, the UE 100 determines if an LTE band in the HPLMN (e.g., the Home LTE-RAN 222) has been acquired. If an LTE band in the HPLMN is acquired, the method 400 may advance to step 430. In step 430, once the UE 100 acquired an LTE band in the HPLMN, the UE 100 may then attempt to re-register with the IMS 250. As discussed above, the UE 100 de-registered with the IMS 250 in step 330 so that it could be connected in a CS mode via the Home legacy RAN 220. In step 435, it is determined if the IMS 250 registration is successful. If the IMS 250 registration is not successful, the UE 100 may continue to operate in SR-LTE mode as shown in step 445. However, if the IMS 250 registration is successful, the UE 100 may return to operating in the VoLTE mode while connected to the newly acquired LTE band of the Home LTE-RAN 222 as shown in step 440.

Returning to step 420, if an LTE band of the Home LTE-RAN 222 is not acquired, the method may advance to step 450. In step 450, upon not acquiring an LTE band in the HPLMN, the UE 100 may try to acquire an LTE band in the EHPLMN (e.g., the Roaming LTE-RAN 260). In step 455, the UE 110 continues in SR-LTE mode while checking for VoLTE capabilities in other EHPLMN bands. Furthermore, the UE 100 may also check the EHPLMN bands for IMS capabilities for both voice and data communications. As described above, the provider of the Roaming LTE-RAN 260 and the Roaming core network 270 may implement a separate IMS from the IMS 250 for the home network.

In step 460, the UE 100 may acquire a band on the EHPLMN having IMS capabilities. Accordingly, the UE 100 may then perform IMS registration with the LTE band of the EHPLMN. In step 465, the UE 100 may perform periodic scans for LTE band in the HPLMN (e.g., home network). As described above, these periodic scans may be performed to move the UE 100 back to its home network as soon as possible.

It should be notes that the exemplary embodiments make the assumption that the UE 100 is capable of operating in packet switched mode (e.g., via the LTE-RAN 222) and the circuit switched mode (e.g., via the legacy RAN 220) and the home cellular core network 230 is aware of this capability. Typically, the UE 100 will include a capability list that it negotiates with the network so that the network is aware of the capabilities of the UE 100.

The exemplary systems and methods described above may be implemented in any number of scenarios to improve the overall operations of the UE 100 in the network. One scenario may be a scenario involving paging performance and OOS recovery time in idle. By utilizing the systems and methods described above, the UE may reduce the time spent scanning bands on EHPLMN before decaling IMS deregistration, thereby providing faster OOS recovery and improved paging performance. Further scenarios may be the battery usage of the UE 100 and the roaming charges incurred by the user of the UE 100.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE") connected to a Long Term Evolution radio access network (LTE-RAN) of a home network and registered with a voice over LTE (VoLTE) service of the home network to perform voice communications via the LTE-RAN:
   detecting a service disrupting event preventing VoLTE communication with the LTE-RAN;
   deregistering from the VoLTE service of the home network;
   prior to scanning for available bands in a roaming LTE-RAN, scanning for available bands in the LTE-RAN of the home network; and
   while scanning for the available bands in the LTE-RAN of the home network, connecting to a further radio access network (RAN) of the home network that allows circuit-switched communications with the home network, wherein the UE performs voice communications as circuit-switched communications via the further RAN.

2. The method of claim 1, further comprising:
   upon failing to acquire a band within the LTE-RAN of the home network, scanning for available bands in the roaming LTE-RAN.

3. The method of claim 1, further comprising:
   acquiring a new band from the LTE-RAN of the home network; and
   attempting to re-register with the VoLTE service of the home network.

4. The method of claim 3, further comprising:
   upon failing to re-register with the VoLTE service, operating the UE to perform voice communications as circuit-switched communications with the home network via the further RAN.

5. The method of claim 3, further comprising:
   upon successful re-registration with the VoLTE, performing voice communications via the LTE-RAN within the new band.

6. The method of claim 1, wherein the further RAN is a legacy voice network protocol compatible with the UE.

7. The method of claim 1, wherein the disrupting event is one of an out of service ("OOS") scenario and a radio link failure ("RLF").

8. The method of claim 1, wherein the UE deregisters from the VoLTE service by deregistering from an IP Multimedia Subsystem (IMS).

9. The method of claim 2, further comprising:
   acquiring a new band from the roaming LTE-RAN;
   attempting to register with a further VoLTE service of roaming LTE-RAN; and
   while attempting to register with the further VoLTE service, continuing to performs voice communications as circuit-switched communications via the further RAN.

10. A user equipment ("UE"), comprising:
    a transceiver configured to connect to radio access networks; and
    a processor coupled to a memory and executing a program stored in the memory, wherein the execution of the program causes the processor to perform operations comprising:
    detecting a service disrupting event preventing packet-switched communication with a home network;
    deregistering from an IP Multimedia Subsystem (IMS) of the home network;
    prior to scanning for available bands in a roaming LTE-RAN, scanning for available bands in the home network; and
    while scanning for available bands in the home network, switching from a packet-switched communication operation to a circuit-switched communication operation.

11. The UE of claim 10, wherein the operations further comprise:
    scanning for further bands in the roaming network;
    acquiring a new band from the roaming network;
    attempting to register with a further IMS of the roaming network;
    while attempting to register with the further IMS, continuing to perform circuit-switched communications.

12. The UE of claim 10, wherein the operations further comprise:
    acquiring a new band from the home network;
    attempting to re-register with the IMS.

13. The UE of claim 12, wherein the operations further comprise:
    upon failure to re-register with the IMS, operating the UE in circuit-switched communication.

14. The UE of claim 12, wherein the operations further comprise:
    upon successful re-registration with the IMS, operating the packet-switched communication operation within the new band.

15. The UE of claim 10, wherein the packet-switched communication operation is a Long Term Evolution ("LTE") protocol including Voice over LTE ("VoLTE") capabilities.

16. The UE of claim 10, wherein the disrupting event is one of an out of service ("OOS") scenario and a radio link failure ("RLF").

17. The UE of claim 10, wherein the circuit-switched communication operation is a legacy voice network protocol compatible with the UE.

18. A non-transitory computer readable storage medium including a set of instructions, wherein the instructions, when executed, cause a processor to perform operations, comprising:

detecting a service disrupting event for a voice over Long Term Evolution (VoLTE) communication with an LTE radio access network (LTE-RAN) of a home network;

deregistering from a VoLTE service of the home network;

prior to scanning for available bands in a roaming LTE-RAN, scanning for available bands in the LTE-RAN of the home network; and while scanning for the available bands in the LTE-RAN of the home network, connecting to a further radio access network (RAN) of the home network that allows circuit-switched communications with the home network, wherein voice communications are performed as circuit-switched communications via the further RAN.

19. The non-transitory computer readable storage medium of claim 18, wherein the operations further comprise:

acquiring a new band from the LTE-RAN of the home network;

attempting to re-register with the VoLTE service of the home network;

upon failing to re-register with the VoLTE service, operating the UE to perform voice communications as circuit-switched communications with the home network via the further RAN; and upon successful re-registration with the VoLTE, performing voice communications via the LTE-RAN within the new band.

20. The non-transitory computer readable storage medium of claim 18, wherein the operations further comprise:

upon failing to acquire a band within the LTE-RAN of the home network, scanning for available bands in the roaming LTE-RAN;

acquiring a new band from the roaming LTE-RAN;

attempting to register with a further VoLTE service of roaming LTE-RAN; and while attempting to register with the further VoLTE service, continuing to performs voice communications as circuit-switched communications via the further RAN.

* * * * *